United States Patent [19]

Carosa et al.

[11] Patent Number: 5,729,885
[45] Date of Patent: Mar. 24, 1998

[54] METHOD FOR ROTOR CONSTRUCTION FOR ALTERNATING INDUCTION MOTOR

[75] Inventors: Paul F. Carosa, Covina; Alan G. Cocconi, Glendora, both of Calif.

[73] Assignee: AC Propulsion, Incorporated, San Dimas, Calif.

[21] Appl. No.: 634,610

[22] Filed: Apr. 18, 1996

Related U.S. Application Data

[62] Division of Ser. No. 328,248, Oct. 24, 1994, Pat. No. 5,642,010.

[51] Int. Cl.[6] .................................................. H02K 15/02
[52] U.S. Cl. ............................... 29/598; 310/42; 310/211
[58] Field of Search .......................... 29/598; 310/211, 310/212, 42

[56] References Cited

U.S. PATENT DOCUMENTS

| | | | |
|---|---|---|---|
| 1,719,829 | 7/1929 | Bunker | 29/598 |
| 1,986,368 | 1/1935 | Schwarz | 172/120 |
| 2,243,021 | 5/1941 | Takenouchi | 172/120 |
| 2,248,167 | 7/1941 | Elsey | 29/598 |
| 2,899,618 | 8/1959 | Noodleman | 318/211 |
| 2,971,106 | 2/1961 | Westphalen | 310/166 |
| 3,157,805 | 11/1964 | Hoffmeyer et al. | 310/61 |
| 3,496,397 | 2/1970 | Andresen | 310/212 |
| 3,509,397 | 4/1970 | Diamont | 310/212 |
| 3,662,195 | 5/1972 | Wielt | 310/64 |
| 3,683,493 | 8/1972 | Begovich | 29/598 |
| 3,778,652 | 12/1973 | Endress | 310/211 |
| 3,826,940 | 7/1974 | McKean et al. | 310/211 |
| 3,898,491 | 8/1975 | Long et al. | 310/183 |
| 3,936,685 | 2/1976 | Glockner et al. | 310/209 |
| 3,987,324 | 10/1976 | Linkous | 310/197 |
| 4,131,990 | 1/1979 | Roach | 29/598 |
| 4,197,975 | 4/1980 | Williamson | 228/48 |
| 4,281,234 | 7/1981 | Dohogne | 219/10.43 |
| 4,309,635 | 1/1982 | Sei et al. | 310/211 |
| 4,370,582 | 1/1983 | Addicott et al. | 310/211 |
| 4,453,101 | 6/1984 | Nelson | 310/211 |
| 4,506,181 | 3/1985 | Jones et al. | 310/156 |
| 4,885,494 | 12/1989 | Higashi | 310/211 |
| 4,970,424 | 11/1990 | Nakamura et al. | 310/262 |
| 5,068,560 | 11/1991 | Lundquist et al. | 310/125 |
| 5,185,918 | 2/1993 | Shafer, Jr. | 29/598 |
| 5,283,941 | 2/1994 | Meyer et al. | 29/598 |
| 5,296,773 | 3/1994 | El-Antably et al. | 310/261 |

*Primary Examiner*—Carl E. Hall
*Attorney, Agent, or Firm*—D'Alessandro & Ritchie

[57] ABSTRACT

A method of fabricating rotors for induction motors. In a first aspect, arcuately spaced apart rotor bars pass through channels the magnetic core of the motor. The rotors are formed of an elongate portion having a constant cross section parallel to the magnetic core laminations and include two portions protruding beyond the end laminations at opposite ends of the magnetic core. The protruding portions are, at one end, a head much like the head of a "T", and at the other end, a straight continuation of the elongate portion. The rotor bars are formed to fit closely with one another in an interleaving arrangement. The protruding portions form an end ring assembly which is subjected to a consolidation process. In this way, for a rotor having N rotor bars, there will only be N braze joints in each end ring. In a second aspect, the "T" shape of the rotor bars may be added after straight rotor bars have been installed in the rotor bar channels in the magnetic core with their end portions extending beyond the rotor bar channels as by inserting small pieces of copper which mate to the shape of the sides of the straight rotor bars between each pair of rotor bars so as to form the end ring. In a third aspect, high-speed operation is facilitated by the addition of a shrink-fit containment ring on each end ring.

3 Claims, 7 Drawing Sheets

METHOD FOR ROTOR CONSTRUCTION FOR ALTERNATING INDUCTION MOTOR

CROSS-REFERENCE TO RELATED APPLICATIONS

This application is a division of U.S. application Ser. No. 08/328,248, filed 24 Oct., 1994, now U.S. Pat. No. 5,642, 010, issued 24 Jun., 1997 in the names of inventors Paul Carosa and Alan Cocconi and entitled "Rotor Construction for Alternating Induction Motor.

BACKGROUND OF THE INVENTION

1. Field of the Invention

The present invention is directed generally to the field of squirrel cage-type asynchronous motors such as alternating current induction motors. More particularly, the present invention is directed to a rotor bar design and method of assembly of the rotor bars which results in the ends of the rotor bars interleaving to form rotor end rings.

2. The Prior Art

High-speed, high efficiency induction motors such as those for use in electrically powered vehicles and other applications require strong, highly conductive end rings. Previous lower efficiency designs required resistive end rings in order to develop start-up torque and/or simplify control. Copper is generally recognized as the material of choice for fabricating such highly conductive end rings, but its material properties pose two major difficulties. First, the large number of bonded interfaces (brazed, soldered or welded) between the individual rotor bars reduces the overall electrical conductivity, and second, the physical strength of copper metal, being a relatively soft and ductile material, is not adequate for long endurance high-speed operation.

One previous assembly method, as disclosed in U.S. Pat. No. 4,131,990 issued January 2, 1979 to Roach, utilized cast end ring assemblies to facilitate rotor assembly. According t this method, rotor bars are inserted through the stack of rotor laminations which form the magnetic core of the motor with end portions of the rotor bars protruding beyond the end laminations at opposite ends of the magnetic core. A pair of end rings disposed at opposite ends of the core are joined to the protruding end portions of the rotor bars. The axially facing inner end surface of each end ring has a series of arcuately spaced radially extending channels formed therein with intervening arcuately spaced radially extending ribs defined therebetween, with the channels receiving the protruding end portions of the rotor bars therein, and with the ribs bearing tightly against the end laminations at opposite ends of the laminated core to maintain the laminated core in tightly compressed condition. While fit for its intended purpose, this method presents a very large number of surfaces which need to be successfully bonded for good electrical conductivity throughout the end rings. A further drawback of the method is the requirement for specially cast end ring assemblies.

U.S. Pat. No. 5,283,941 issued Feb. 8, 1994 to Meyer et al. describes a method for brazing rotor bars to end rings of an asynchronous AC motor which employs treated copper end rings and copper rotor bars in a process that allows brazing without temperature extremes affecting the mechanical properties of the pre-treated copper. While fit for its intended purpose, a drawback of this method is the limited nature of the rotor bar to end ring electrical contact which will result in a higher resistance in the end ring than is desired for certain applications.

U. S. Pat. No. 4,970,424 issued Nov. 13, 1990 to Nakamura et al. discloses a high speed induction motor using aluminum rotor bars and aluminum end rings with an iron containment/balancing ring around each cast aluminum end ring. As pointed out in the patent, aluminum end rings suffer from operation at high speed and tend to fracture, hence the need for an iron containment ring about them. While fit for its intended purpose, the end rings formed of aluminum have less electrical conductivity than end rings formed from copper. Copper has a significantly greater coefficient of thermal expansion than iron and, accordingly a structure having copper end rings with an iron containment could not be easily manufactured as there would be risk of fracture of the containment at high operating temperatures or during the manufacturing process itself.

SUMMARY OF THE INVENTION

The present invention is directed to an improved rotor bar design and method of fabrication of asynchronous motors using such rotor bars. According to a first aspect of the invention, arcuately spaced apart rotor bars which pass through rotor bar channels formed of rotor bar slots in individual laminations of the magnetic core of the motor parallel to the rotational axis thereof are formed of an elongate portion having a constant cross section parallel to the magnetic core laminations and include two portions protruding beyond the end laminations at opposite ends of the magnetic core. The protruding portions are, at one end, a head much like the head of a "T", and at the other end, a straight continuation of the elongate portion. Thus the rotor bars are "T-shaped" having the head of a "T" at one end (the head end) and a straight portion at the other end (the end portion). The rotor bars are formed to fit closely with one another in an interleaving arrangement. The T-shaped rotor bars are inserted through the magnetic core in an alternating fashion so that the head end of one "T" is always adjacent and essentially in contact with the end portions of two adjacent (clockwise and counterclockwise) "T"s, and so on. In this manner the opposing end rings are formed of the alternating head end and end portions of the T-shaped rotor bars. The end ring assembly is then subjected to a process such as brazing, soldering or welding to complete the physical and electrical connection of all of the heads and end portions of the T-shaped rotor bars at the end rings. In this way, for a rotor having N rotor bars, there will only be N braze joints in each end ring. As each braze joint increases the resistance of the end ring, a minimum number of such braze joints is desirable in order to maximize efficiency and minimize losses thus increasing the output power level that the motor is capable of sustaining. The T-shaped rotor bars may either be initially formed as T-shaped rotor bars from a single piece of copper as by casting, stamping, machining, or the like, or assembled from multiple pieces of copper which are brazed, soldered, welded, or the like, to form the T-shaped rotor bars. Where the T-shaped rotor bars are formed from three pieces (i.e., two additional braze joints per rotor bar) for a rotor having N rotor bars, there will be only 2 N braze joints in each end ring. While more than the previously described version, this is still an improvement over the prior art.

According to a second aspect of the present invention, the "T" shape of the rotor bars may be added after straight rotor bars have been installed in the rotor bar channels in the magnetic core with their end portions extending beyond the rotor bar channels. Such a fabrication technique may be realized in a number of ways. According to one method, small pieces of copper which mate to the shape of the sides of the straight rotor bars may be inserted between each pair of rotor bars so as to form the end ring. These may be tack welded or soldered in place to hold them prior to end ring consolidation step. In this case, there are twice as many brazed joints in the end ring as when preformed single piece "T" shaped rotor bars are used, but this is still an advantage over prior art structures.

According to a third aspect of the present invention, high-speed operation is facilitated by the addition of a shrink-fit beryllium-copper containment ring on each end ring. This containment ring acts to contain the copper end rings against outward forces developed during operation of the motor while having a similar coefficient of thermal expansion to copper (the end ring material) so that significant thermally derived differential forces are not developed during operation between the end rings and their containment rings.

OBJECTS AND ADVANTAGES OF THE INVENTION

Accordingly, it is an object of the present invention to provide an improved asynchronous alternating current motor and method of fabrication.

It is a further object of the present invention to provide an asynchronous alternating current motor capable of high efficiency operation.

It is a further object of the present invention to provide an asynchronous alternating current motor capable of high-speed operation.

It is a further object of the present invention to provide an asynchronous alternating current motor and method of fabrication which reduces the production costs of fabrication over existing asynchronous alternating current motors.

It is a further object of the present invention to provide an asynchronous alternating current motor and method of fabrication which eliminates the need for separately formed end ring assemblies thus reducing the production costs of fabrication over existing asynchronous alternating current motors.

It is a further object of the present invention to provide a rotor for an asynchronous alternating current motor and method of fabrication which yields a rotor that has lower electrical resistance and losses and hence higher electrical operating efficiency, that produces less waste heat in operation, and that is capable of higher sustained power output in operation.

Yet a further object of the present invention to provide an asynchronous alternating current motor and method of fabrication which provides a more reliable motor with fewer bonds subject to cracking and other well-known failure modes.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Rotor bars used in various prior art asynchronous motors are mostly elongate in that they are long and generally thin, but they utilize different rotor bar vertical axial cross-sectional patterns depending upon the use that the motor will be put to. For example, U.S. Pat. No. 3,496,397 to Andresen teaches a number of such cross-sectional patterns and prior art designs. Similarly, U.S. Pat. No. 3,509,397 to Diamont, U.S. Pat. No. 2,899,618 to Noodleman, U.S. Pat. No. 2,971,106 to Westphalen, U.S. Pat. No. 1,986,368 to Schwarz, U.S. Pat. No. 3,987,324 to Linkous, U.S. Pat. No. 3,683,493 to Begovich, and U.S. Pat. No. 4,131,990 to Roach all teach various rotor bar cross sections applicable to a variety of uses and desired operating characteristics of the asynchronous motor. The invention taught herein is directed not to the rotor bar's vertical axial cross-section but to a design for the rest of the rotor bar and is thus applicable with any or all of the foregoing rotor cross-section designs.

Figure 1:
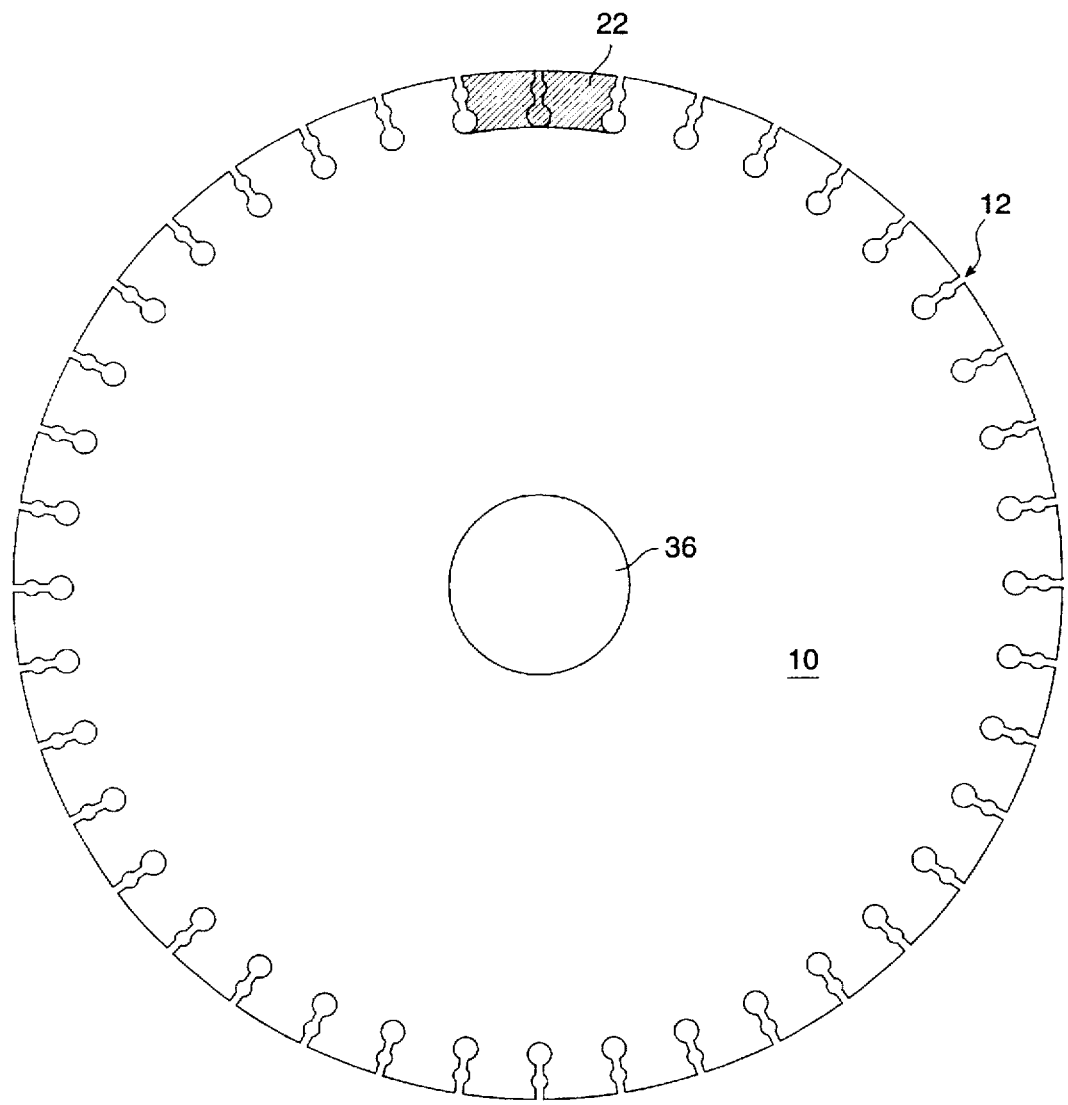
FIG. 1 is a top view of an end magnetic core lamination of an asynchronous alternating current motor showing an axial view of a single T-shaped rotor bar which is one of a plurality of such rotor bars which are used to form the rotor end rings according to a preferred embodiment of the present invention.
Figure 2:
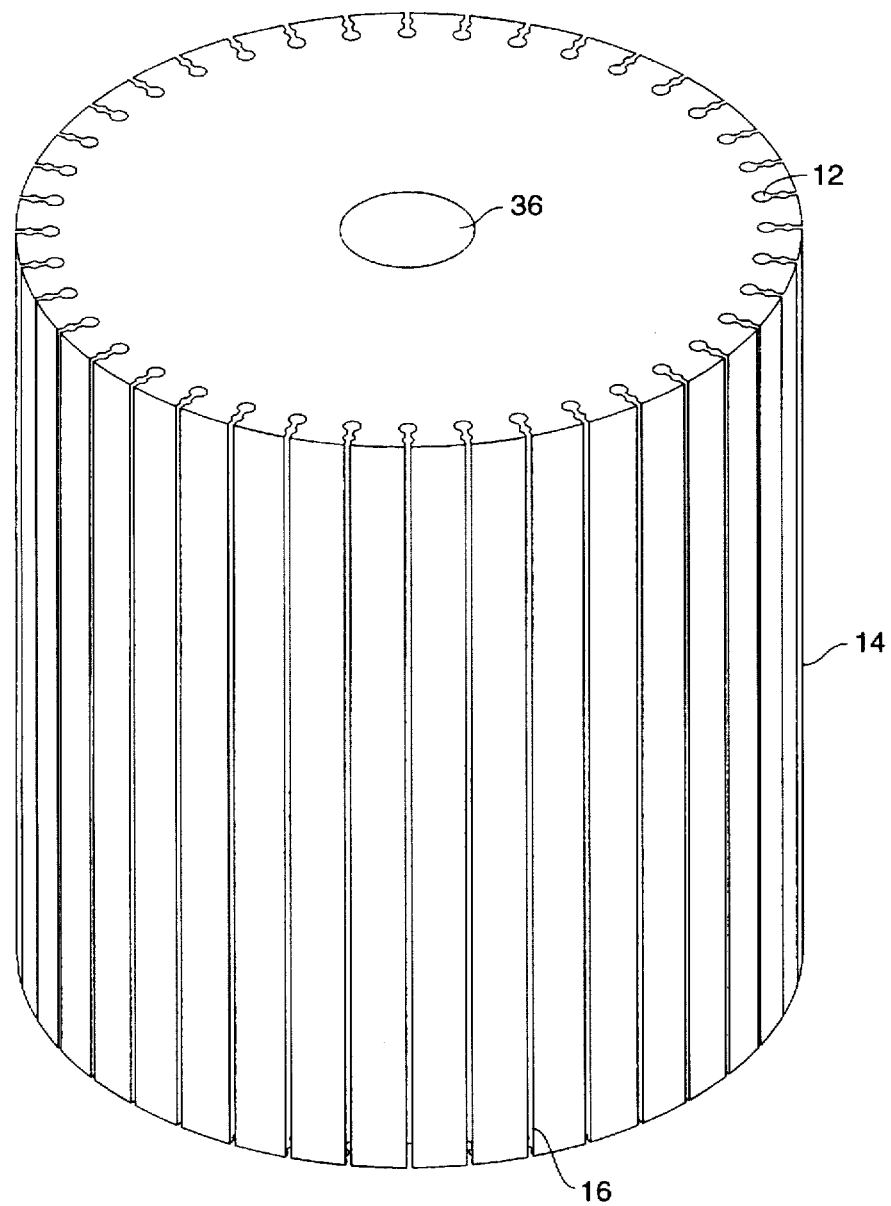
FIG. 2 is a front top perspective view of the magnetic core lamination stack of an asynchronous alternating current motor according to a preferred embodiment of the present invention with the rotor bars removed for clarity.

FIG. 1 shows a typical lamination 10 from a laminated magnetic core for an asynchronous motor. Lamination 10 is an end lamination (top or bottom) and comprises peripherally located and arcuately spaced apart slots 12 through which rotor bars are placed during assembly. FIG. 2 shows a stack 14 of laminations 10 formed together with slots 12 aligned to form channels 16 through which rotor bars may be placed. Laminations are preferably fabricated of a ferromagnetic material such as silicon iron as is well known to those of ordinary skill in the art.

Figure 3:
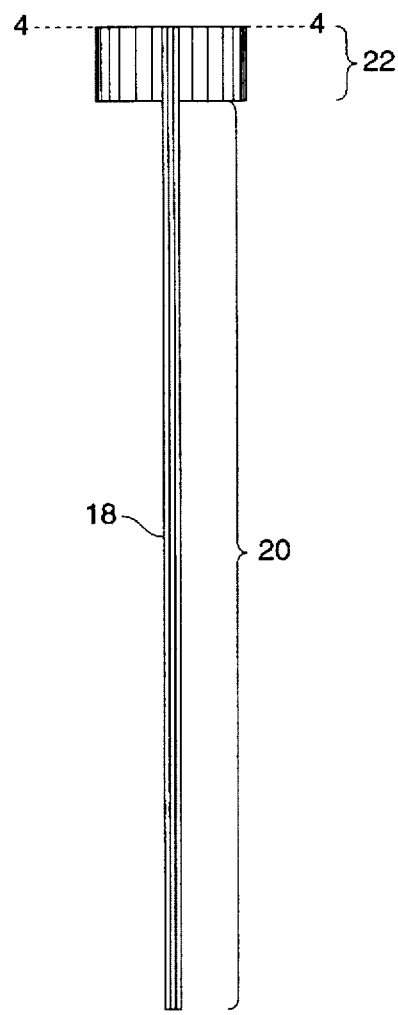
FIG. 3 is an end view of one of the T-shaped rotor bars of an asynchronous alternating current motor according to a preferred embodiment of the present invention.
Figure 4:
FIG. 4 is a view taken along 4—4 of FIG. 3 of one of the T-shaped rotor bars of an asynchronous alternating current motor according to a preferred embodiment of the present invention.

Turning to FIG. 3, a rotor bar 18 according to a preferred embodiment of the present invention, comprises an elongate portion 20 and a head portion 22 which, when formed together, form a T-shaped rotor bar. FIG. 4 shows a top view of head portion 22 of rotor bar 18 according to a preferred embodiment of the present invention. As can be seen in FIG. 4, head portion 22 is curved to conform to the outer circumference of lamination 10. As discussed above, the cross-sectional shape of the elongate portion 20 of rotor bar 18 may be any suitable shape depending upon the use that the motor will be put to and the operating characteristics desired.

Figure 5:
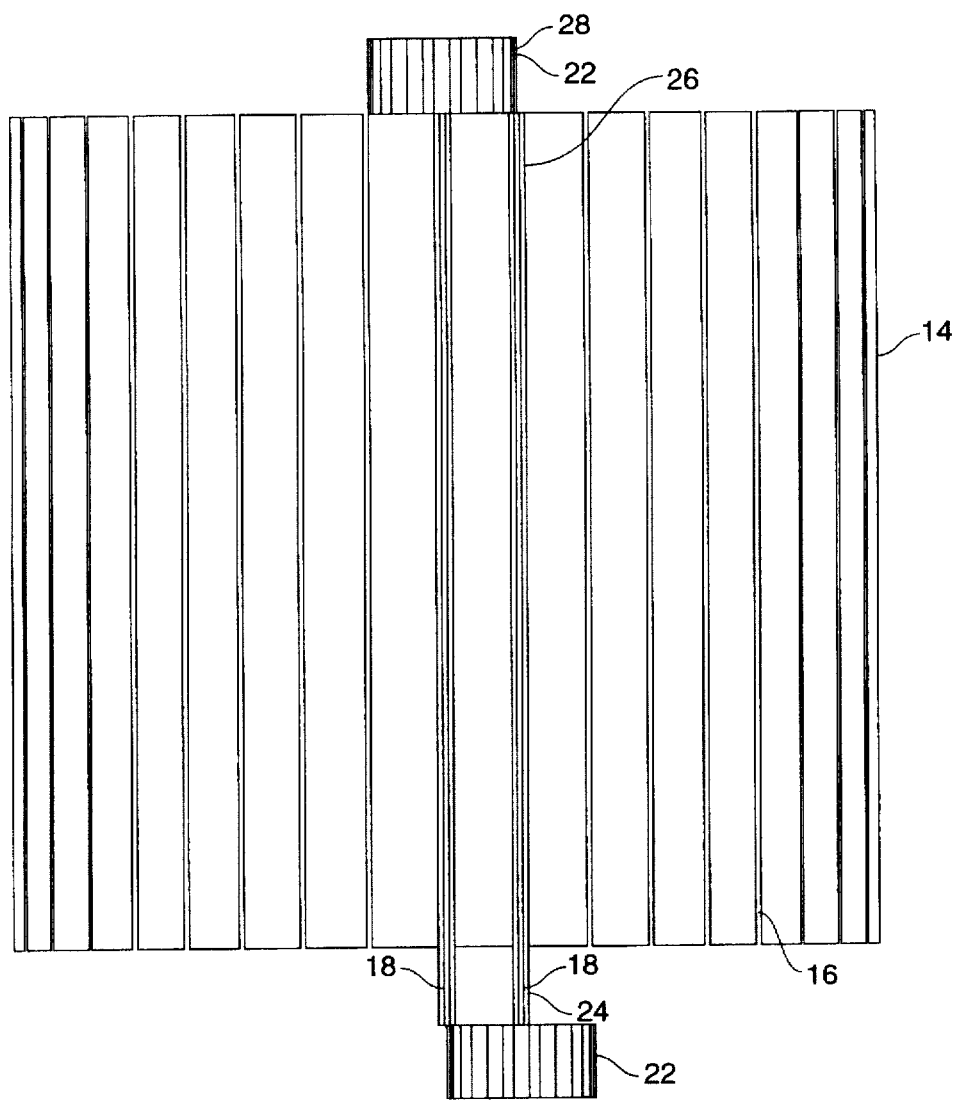
FIG. 5 is a side view of the magnetic core lamination stack of an asynchronous alternating current motor according to a preferred embodiment of the present invention with only two adjacent rotor bars shown (and not inserted in the stack) for clarity.
Figure 7:
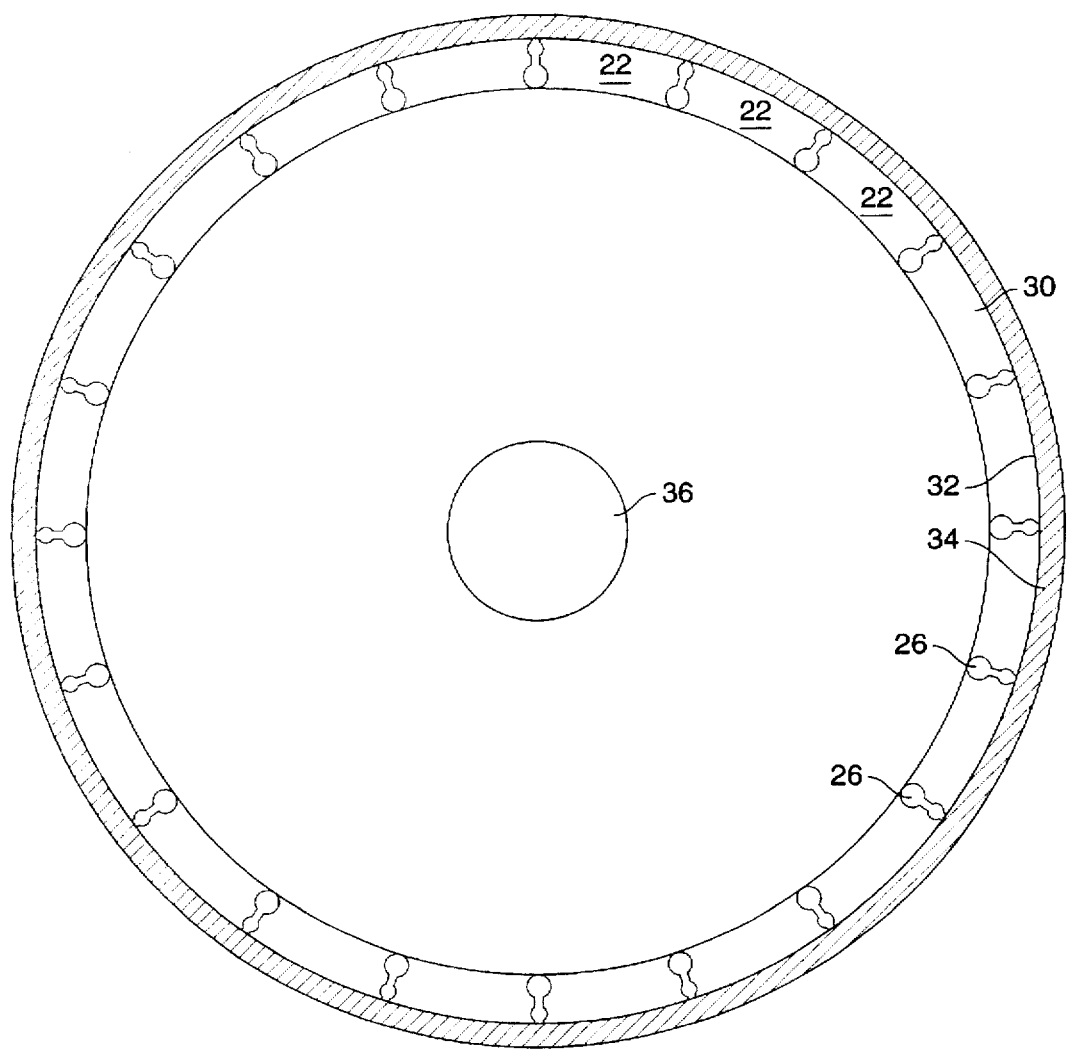
FIG. 7 is a top view of the rotor of an asynchronous alternating current motor according to a preferred embodiment of the present invention showing how the rotor bars interleave to form an end ring surrounding by a containment ring.

An important aspect of the present invention is realized by using the rotor bar heads 22 to form a conductive end ring for the rotor. FIG. 5 shows a preferred arrangement for inserting rotor bars 18 so that they interleave to form end rings on both the top and bottom of the rotor. Rotor bars 18 are interleaved one with the head on top of the rotor, the next with the head on the bottom of the rotor, the next with the head on the top of the rotor, and so on, as shown. In FIG. 5, for clarity, the right-most rotor bar 24 is shown in front of and partially withdrawn from the magnetic core stack 14. The bar to its left is also shown in front of the stack. When inserted fully, end portion 26 will mate with adjacent head portion 28 and a similar arrangement will obtain at the bottom of the core stack 14 resulting in the formation of a conductive end ring 30 (FIG. 7). As can be seen in FIG. 7, end ring 30 is formed of alternating head portions 22 and mating end portions 26 of T-shaped rotor bars. By the use of the term "mating" or "mate" in reference to the union of adjacent head portions and end portions at a surface, it is intended to include designs where the rotor bar cross sections have flat sides, curved sides, and complex sides (as shown, for example, at 26 in FIG. 7) which may also provide the capability of an interlocking "keying" between adjacent parts. Final electrical connection of the various constituents of the end ring is accomplished by brazing, welding or soldering (or similar process) (collectively referred to as "electrically consolidating") to form a permanent electrical connection among the constituents. Presently preferred is a dip brazing process in which the end rings are immersed and heated in a brazing fluid which consolidates all of the abutting pieces of copper in the end rings. Such processes are well known to those of ordinary skill in the art.

The end ring may preferably be machined down to a smooth circular outer surface 32 and then a containment ring 34 may be added in order to confine the end ring 30 during high speed operation.

Preferably, the rotor bars 18 are fabricated of copper or an alloy thereof with high electrical conductivity properties. Other similar materials could also be used, but relatively pure copper is presently preferred for its high electrical conductivity and relatively low cost. Containment ring 34 is preferably beryllium-copper (BeCu) which has lower electrical conductivity but is stronger and less ductile than copper. Containment ring 34 may be slip-fit, as known to those of ordinary skill in the art, over circular outer surface 32 by cooling end ring 30 to shrink it and heating containment ring 34 to enlarge it, placing containment ring 34 over circular outer surface 32, and then allowing the materials to reach thermal equilibrium. While other materials could be substituted for BeCu, BeCu is presently preferred because its coefficient of thermal expansion is similar to that of copper, hence there are likely to be less radial differential forces acting during normal operational thermal cycling between the end ring and the containment ring than if materials with dissimilar coefficients of thermal expansion were used. This reduces the possibility of cracking and failure after repeated thermal cycling.

Figure 6:
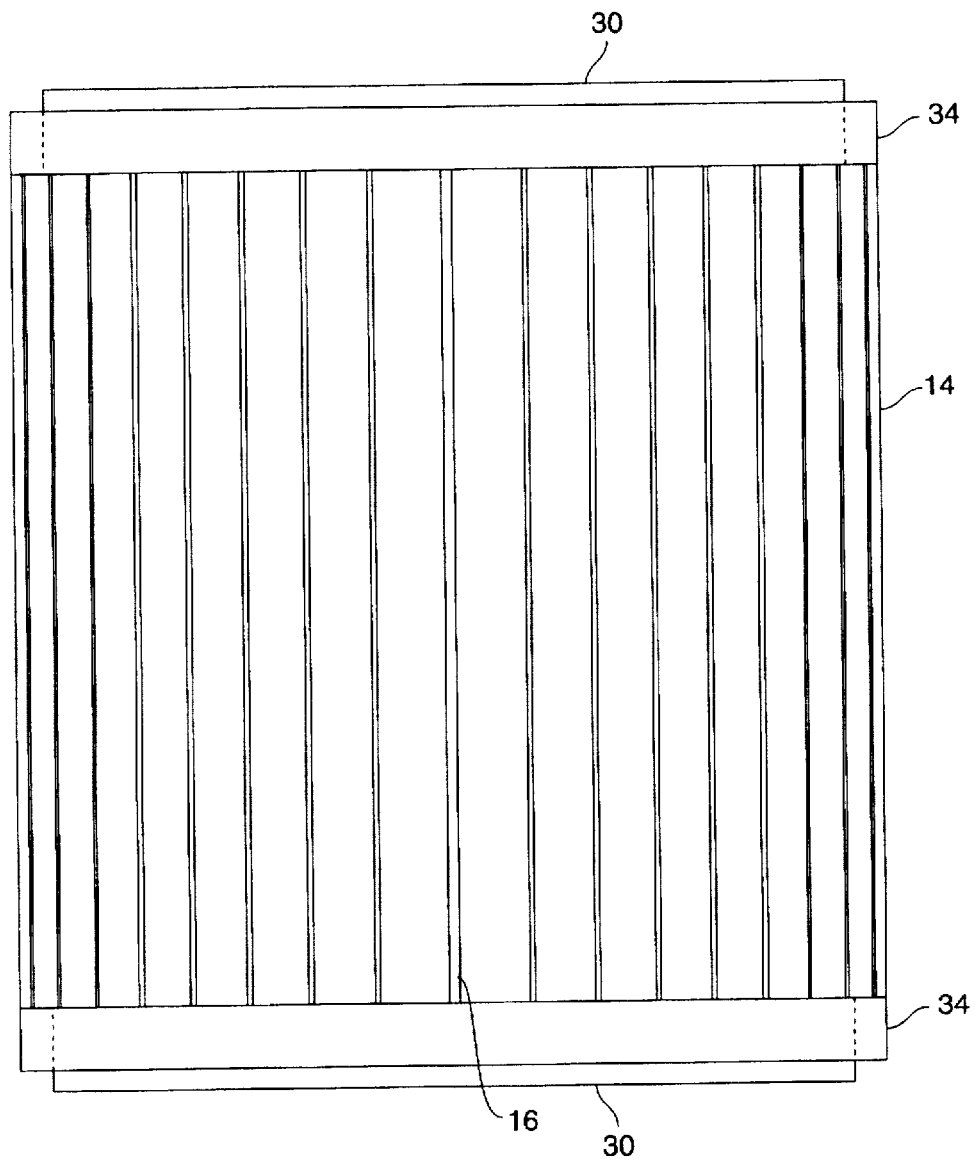
FIG. 6 is a side view of the magnetic core lamination stack of an asynchronous alternating current motor according to a preferred embodiment of the present invention with all rotor bars in place and surrounding by containment rings.

FIG. 6 shows a side view of the completed rotor assembly absent rotor shaft (not shown) which would be present in a working example and would pass through shaft apertures 36 (FIG. 1).

Figure 8:
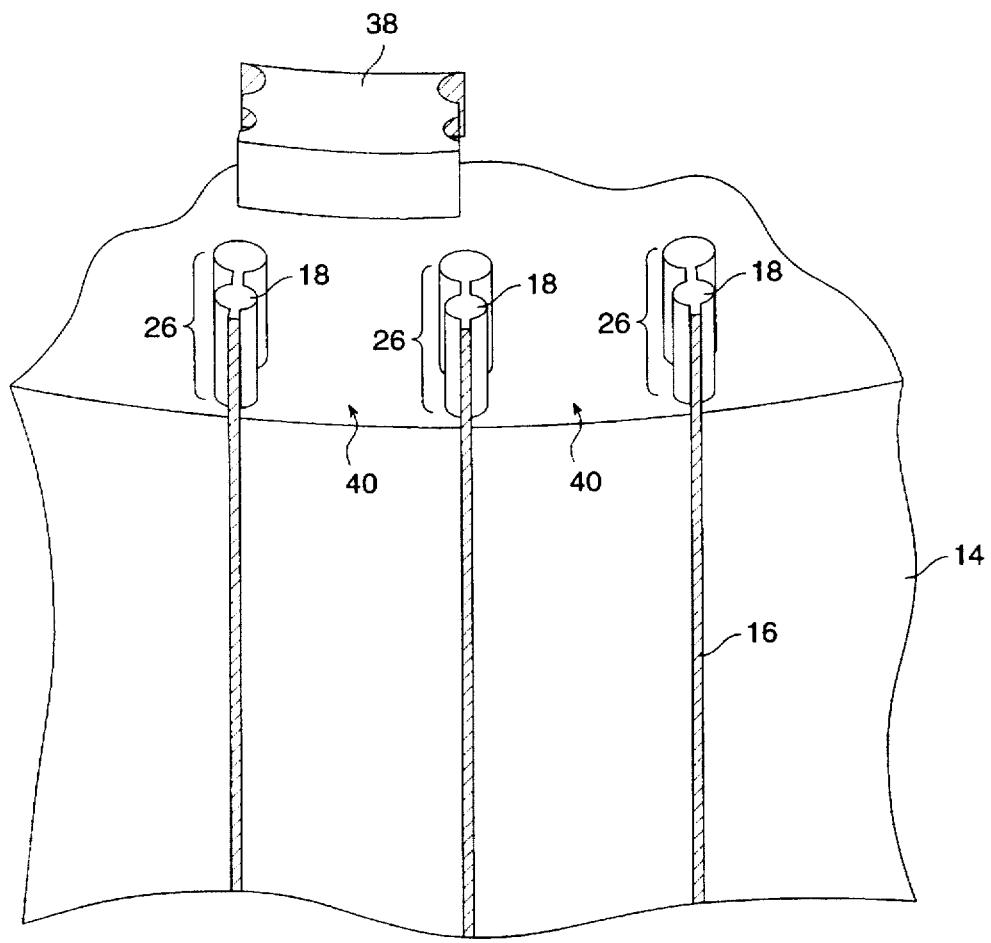
FIG. 8 is a top perspective view of a portion of the magnetic core lamination stack according to a second aspect of the present invention showing the orientation of a fill part.

While it is presently preferred to use single piece preformed "T" shaped rotor bars, many of the advantages of such rotor bars may be realized with lower tooling costs with the following construction. Straight rotor bars comprise an elongate central portion and a pair of end portions. The straight rotor bars pass through the rotor bar channels of the magnetic core so that the straight end portions protrude into the volume that will form the end rings on each end of the rotor while the central portions of the rotor bars are retained within the rotor bar channels. In this case, all rotor bars may be of constant cross-section but there is no requirement that they be, rather, such a construction is the simplest. Each rotor bar is attached to all its adjacent clockwise and counterclockwise rotor bars by inserting a "fill part" 38 made preferably of the same material as the rotor bars (again, preferably copper) into gaps 40 between clockwise and counterclockwise adjacent rotor bar end portions 26 to form unconsolidated end rings. Here, the end portions 26 of rotor bars 18 extending into the volume which will be the end rings, together with the fill parts 38 form the unconsolidated end rings. In order to hold the assembly together until and during brazing, the assembly may be clamped, tack welded, or, if a rotor cross-section shape permits it, held together by the "keyed" interlocking effect of adjacent fill parts 38 and rotor bars 18 which can be seen in FIG. 8. Electrical consolidation is then achieved as described above and, while the resulting structures have 2N braze joints per end ring with N rotor bars, it is still an improvement over prior art rotors. One of skill in the art would prefer this mode of construction where small numbers of rotor bars are to be constructed and the tooling costs for the fabrication of one piece T-shaped rotor bars are prohibitively expensive. Where large numbers of rotor bars are to be fabricated, one piece construction with stamping or a similar process is likely to be preferred.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A method of fabricating a rotor for an asynchronous electrical motor comprising:

forming a magnetic motor core from a plurality of magnetic laminations having a plurality of arcuately spaced apart rotor bar slots at the periphery thereof, said plurality of arcuately spaced apart rotor bar slots forming a plurality of arcuately spaced apart rotor bar channels through said magnetic motor core at said periphery thereof;

forming a plurality of T-shaped rotor bars, each having a head portion and an elongate portion having an end portion;

inserting said T-shaped rotor bars in alternating fashion into said rotor bar channels, to form a pair of end rings at opposite ends of said magnetic core; and electrically consolidating said end rings.

2. A method according to claim 1 further comprising:

forming a containment ring about each of said end rings.

3. A method according to claim 2 wherein said containment ring forming step comprises:

cooling said end rings to a first temperature;

heating said containment rings to a second temperature greater than said first temperature;

placing said containment rings over said end rings; and allowing said containment rings and said end rings to reach substantially the same temperature.

\* \* \* \* \*

UNITED STATES PATENT AND TRADEMARK OFFICE
CERTIFICATE OF CORRECTION

PATENT NO. : 5,729,885
DATED : March 24, 1998
INVENTOR(S) : Paul F. Carosa, Alan G. Cocconi It is certified that error appears in the above-indentified patent and that said Letters Patent is hereby corrected as shown below:

On the title page, item [54] and Column 1,

In the title of the invention, after "ALTERNATING", please insert --CURRENT--.
On column 1, line 11, after "Alternating," please insert --Current--.
On column 1, line 37, please replace "t" with --to--.

Signed and Sealed this

Eighteenth Day of August, 1998

Attest:

BRUCE LEHMAN

*Attesting Officer*    *Commissioner of Patents and Trademarks*